(12) United States Patent
Kang

(10) Patent No.: US 11,991,612 B2
(45) Date of Patent: May 21, 2024

(54) BLUETOOTH DATA TRANSMISSION METHOD AND APPARATUS, TERMINAL AND STORAGE MEDIUM

(71) Applicant: ZTE CORPORATION, Shenzhen (CN)

(72) Inventor: Jianchao Kang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 141 days.

(21) Appl. No.: 17/610,629

(22) PCT Filed: Aug. 21, 2020

(86) PCT No.: PCT/CN2020/110363
§ 371 (c)(1),
(2) Date: Nov. 11, 2021

(87) PCT Pub. No.: WO2021/043003
PCT Pub. Date: Mar. 11, 2021

(65) Prior Publication Data
US 2022/0322059 A1 Oct. 6, 2022

(30) Foreign Application Priority Data
Sep. 6, 2019 (CN) .......................... 201910843854.9

(51) Int. Cl.
*H04W 4/80* (2018.01)
(52) U.S. Cl.
CPC .................................... *H04W 4/80* (2018.02)

(58) Field of Classification Search
CPC ....................................................... H04W 4/80
See application file for complete search history.

(56) References Cited

U.S. PATENT DOCUMENTS

| 7,257,428 B2 | 8/2007 | Yueh | |
|---|---|---|---|
| 2005/0202783 A1* | 9/2005 | Yueh | H04M 1/6091 455/41.3 |

(Continued)

FOREIGN PATENT DOCUMENTS

| CN | 104980884 A | 10/2015 |
|---|---|---|
| CN | 107770760 A | 3/2018 |

(Continued)

OTHER PUBLICATIONS

International Search Report for Application No. PCT/CN2020/110363, dated Nov. 20, 2020, 4 pages including English translation.

(Continued)

*Primary Examiner* — David Bilodeau
(74) *Attorney, Agent, or Firm* — Morgan, Lewis & Bockius LLP

(57) ABSTRACT

Provided are a Bluetooth data transmission method and apparatus, a terminal and a storage medium. The Bluetooth data transmission method includes: detecting the number of connected Bluetooth devices and types of connected Bluetooth devices; determining, according to the number of connected Bluetooth devices and types of the connected Bluetooth devices, attribute states of the connected Bluetooth devices; and transmitting, according to the attribute states, to-be-outputted Bluetooth data to one of the connected Bluetooth devices.

20 Claims, 6 Drawing Sheets

---

Detect the number of connected Bluetooth devices and types of the connected Bluetooth devices — 110

Determine attribute states of the connected Bluetooth devices according to the number of the connected Bluetooth devices and the types of the connected Bluetooth devices — 120

Transmit to-be-outputted Bluetooth data to the corresponding connected Bluetooth device according to the attribute states — 130

(56) References Cited

U.S. PATENT DOCUMENTS

| | | | |
|---|---|---|---|
| 2009/0061769 A1* | 3/2009 | Zimbric | H04M 1/72412 455/41.2 |
| 2014/0068297 A1* | 3/2014 | An | G06F 1/3203 713/320 |
| 2016/0286337 A1* | 9/2016 | Thekkedathu Sivaraman | H04L 69/14 |
| 2021/0410201 A1* | 12/2021 | Kim | G06V 20/20 |
| 2022/0210853 A1* | 6/2022 | Nallatamby | H04W 76/15 |

FOREIGN PATENT DOCUMENTS

| | | |
|---|---|---|
| CN | 108024237 A | 5/2018 |
| CN | 108769431 A | 11/2018 |
| CN | 109548184 A | 3/2019 |
| WO | WO-2009032571 A1 | 3/2009 |
| WO | WO-2016153681 A1 | 9/2016 |

OTHER PUBLICATIONS

"Method and System for Dynamically Routing Requests via Bluetooth based on User Profiles ED—Darl Kuhn", IP.com, IP.com, Inc., West Henrietty, NY, US, Dec. 30, 2013, 4 pages.

Extended European Search Report of Application No. 20860226.8, dated Jul. 6, 2023, 11 pages.

* cited by examiner

BLUETOOTH DATA TRANSMISSION METHOD AND APPARATUS, TERMINAL AND STORAGE MEDIUM

CROSS-REFERENCE TO RELATED APPLICATIONS

This is a National Stage Application, filed under 35 U.S.C. 371, of International Patent Application No. PCT/CN2020/110363, filed on Aug. 21, 2020, which claims priority to Chinese Patent Application No. 201910843854.9 filed with the China National Intellectual Property Administration (CNIPA) on Sep. 6, 2019, the disclosures of which are incorporated herein by reference in theirs entireties.

TECHNICAL FIELD

The present disclosure relates to Bluetooth communication technologies, for example, a Bluetooth data transmission method and apparatus, a terminal and a storage medium.

BACKGROUND

With the development of wireless communication and short-range technology, the application field of Bluetooth technology is increasingly expanding, and types of Bluetooth devices supporting Bluetooth connections are also increasing. Different devices can transmit data within a certain range to achieve resource sharing. In the related art, in the case where a terminal is connected to a Bluetooth device, media audio data and phone call content of the terminal are outputted through the same Bluetooth device, and different types of data affect each other. For example, in the process of transmitting the call content to a Bluetooth speaker for playing, the transmission of media audio data will be suspended, and the audio and video playing will be interrupted. Such a Bluetooth data transmission mode is inflexible, which leads to poor experience of users in multimedia playing and phone calling.

SUMMARY

The present application provides a Bluetooth data transmission method and apparatus, a terminal and a storage medium to improve the transmission flexibility of Bluetooth data.

A Bluetooth data transmission method is provided. The method includes the steps described below.

The number of connected Bluetooth devices and types of the connected Bluetooth devices are detected.

Attribute states of the connected Bluetooth devices are determined according to the number of the connected Bluetooth devices and the types of the connected Bluetooth devices.

To-be-outputted Bluetooth data is transmitted to one of the connected Bluetooth devices according to the attribute states.

A Bluetooth data transmission apparatus is further provided. The apparatus includes a detection module, an attribute determination module and an outputting module.

The detection module is configured to detect the number of connected Bluetooth devices and types of the connected Bluetooth devices.

The attribute determination module is configured to determine attribute states of the connected Bluetooth devices according to the number of the connected Bluetooth devices and the types of the connected Bluetooth devices.

The outputting module is configured to transmit to-be-outputted Bluetooth data to one of the connected Bluetooth devices according to the attribute states.

A terminal is further provided.

The terminal includes one or more processors and a storage apparatus.

The storage apparatus is configured to store one or more programs.

The one or more programs, when executed by the one or more processors, cause the one or more processors to implement the Bluetooth data transmission method described above.

A computer-readable storage medium is further provided. The computer-readable storage medium is configured to store a computer program, when the program is executed by a processor, the Bluetooth data transmission method described above is implemented.

DETAILED DESCRIPTION

Figure 1:
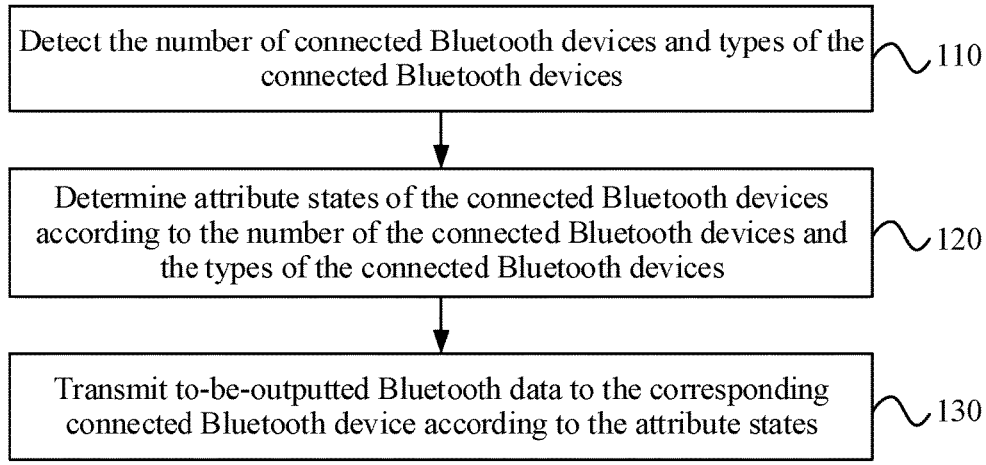
FIG. 1 is a flowchart of a Bluetooth data transmission method according to an embodiment.

The present application is described below in conjunction with drawings and embodiments. The embodiments described herein are intended to explain and not to limit the present application. For ease of description, only part, not all, of structures related to the present application is illustrated in the drawings.

Media audio data and phone call data are usually transmitted to the same Bluetooth device for playing, and the flexibility of the Bluetooth data transmission method is poor. For example, during driving, a terminal is connected to a Bluetooth car kit to play multimedia data such as audio and video to the driver and passengers, but if there is an incoming call during the playing process, the transmission and playing of multimedia data will be suspended. In this case, the phone call content of the driver will be transmitted to the Bluetooth car kit and then played, and since there are other passengers in the car, the privacy of the phone call of the driver cannot be guaranteed. In another example, the terminal is connected to the Bluetooth head-set for the driver to answer the phone call at any time, but in this case, the multimedia data can only be outputted on the Bluetooth head-set side. Although the privacy of the driver is guaranteed, the audio and video cannot be shared with other passengers.

The Bluetooth data transmission method provided by the embodiment is suitable for the case where the terminal is connected to at least two Bluetooth devices and may be applied to the scenario of transmitting media audio data and phone call data. The terminal may be connected to multiple Bluetooth devices at the same time and distinguish the media audio data and the phone call data by optimizing the protocol attributes supported by the Bluetooth devices, so as to transmit different types of data to different Bluetooth devices for outputting. For example, in the case of receiving a media audio playing instruction, the media audio data is transmitted to the Bluetooth car kit instead of the Bluetooth head-set for playing, so that the media audio data can be shared with the driver and passengers. In the case of receiving a phone call instruction, for example, in the process of incoming or outgoing calls, the phone call data (including incoming or outgoing ring tone and phone call content) is transmitted to the Bluetooth head-set instead of the Bluetooth car kit, so as to ensure the privacy of the phone call of the driver while sharing the media audio data during the phone call. These two kinds of data are transmitted through different channels without affecting each other, thereby improving the transmission flexibility of different types of data and improving the user experience.

FIG. 1 is a flowchart of a Bluetooth data transmission method according to an embodiment. As shown in FIG. 1, the method provided by this embodiment includes steps 110, 120, and 130.

In Step 110, the number of connected Bluetooth devices and types of the connected Bluetooth devices are detected.

In Step 120, attribute states of the connected Bluetooth devices are determined according to the number of the connected Bluetooth devices and the types of the connected Bluetooth devices, where the attribute state includes a media audio attribute state and a phone call attribute state.

In Step 130, to-be-outputted Bluetooth data is transmitted to the corresponding connected Bluetooth devices according to the attribute states.

In this embodiment, the terminal may establish connections with multiple Bluetooth devices at the same time, the maximum connection number of the Bluetooth devices may be configured by a user, and the attribute state of each connected Bluetooth device is determined according to the number of the connected Bluetooth devices and the types of the connected Bluetooth devices, so as to transmit different types of to-be-output Bluetooth data to different Bluetooth devices respectively. The attribute state includes the media audio attribute state and the phone call attribute state. The phone call attribute corresponds to the hands-free profile (HFP) or head-set profile (HSP) protocols of Bluetooth, and the media audio attribute corresponds to the advanced audio distribution profile (A2DP) protocol of Bluetooth.

For example, the connected Bluetooth devices include one Bluetooth car kit and one Bluetooth head-set. In this case, for the Bluetooth car kit, the phone call attribute state is set to an off-state while the media audio attribute state is set to an on-state, so as to transmit the media audio data to the Bluetooth car kit for playing. For the Bluetooth head-set, the media audio attribute state is set to the off-state while the phone call attribute state is set to the on-state, so as to transmit the phone call data to the Bluetooth head-set for playing. In another example, the attribute state of each connected Bluetooth device is the on-state by default, and the Bluetooth data may be transmitted to any one of the connected Bluetooth devices for playing according to a certain rule. In the case of receiving a media audio playing instruction, the phone call attribute of the Bluetooth head-set is turned off so that the media audio data is only transmitted to the Bluetooth car kit. In the case of receiving a phone call instruction, the phone call attribute of the Bluetooth car kit is turned off so that the phone call data is only transmitted to the Bluetooth head-set. In another example, there are multiple Bluetooth devices of the same type connected to the terminal. For example, if the connected Bluetooth devices include two Bluetooth car kits, the attribute state of the Bluetooth car kit connected to the terminal may be set to the off-state first, and the attribute state of the Bluetooth car kit connected to the terminal may be set to the on-state later, so that the media audio data and the phone call data are transmitted to the Bluetooth car kit that is later connected to the terminal.

In this embodiment, the protocol attributes supported by the Bluetooth devices are optimized according to the number of the connected Bluetooth devices and the types of the connected Bluetooth devices, and different types of data are transmitted to different Bluetooth devices by setting the attribute states of the connected Bluetooth devices. In this way, different types of data may be transmitted independently without affecting each other, thereby improving the transmission flexibility of different types of data between different Bluetooth devices and improving the user experience.

In an embodiment, the connected Bluetooth devices are represented by paired devices [1, 2, . . . , N], where N is the maximum number of Bluetooth devices that may simultaneously establish connections with the terminal. For example, paired device=[1] represents the other terminal that establishes a Bluetooth connection with the terminal; paired device=[2] represents a Bluetooth head-set; paired device=[3] represents a Bluetooth speaker; paired device=[4] represents a Bluetooth car kit; paired device=[5] represents a Bluetooth keyboard; paired device=[6] represents a Bluetooth adapter; paired device=[7] represents other Bluetooth devices (such as a smart bracelet, a positioner, and the like). In the case where the terminal is not paired with any Bluetooth device, for example, when the terminal is connected to a Bluetooth head-set for the first time, after the connection succeeds, the number of connected Bluetooth devices is 1, that is, paired device=[2]; in another example, when the terminal is connected to a Bluetooth car kit for the first time, after the connection succeeds, the number of connected Bluetooth devices is 1, that is, paired device=[4]; in another example, when the terminal is connected to both a Bluetooth head-set and a Bluetooth car kit, the number of connected Bluetooth devices is 2, that is, paired device=[2, 4].

In an embodiment, Step 110 is executed in the case of receiving a media audio playing instruction (for example, an instruction for playing an audio or video) or a phone call instruction (for example, an instruction for an incoming call or an outgoing call).

In an embodiment, Step 120 includes the following step: in the case where the number of the connected Bluetooth devices is greater than or equal to 2 and not all of the types of the connected Bluetooth devices are identical, an attribute state of each of the connected Bluetooth devices is determined according to a first priority. In this embodiment, the attribute state includes the media audio attribute state, and the to-be-outputted Bluetooth data is media audio data generated according to a media audio playing instruction.

In this embodiment, the step in which the attribute state of each of the connected Bluetooth devices is determined according to the first priority includes the following step: media audio attribute states of connected Bluetooth devices except a connected Bluetooth device with the highest priority among the connected Bluetooth devices are set to an off-state according to the first priority.

In an embodiment, before Step 120, the method further includes the following step: the connected Bluetooth devices are sorted from low to high according to privacies corresponding to the types of the connected Bluetooth devices to obtain the first priority of the connected Bluetooth devices. For example, the connected Bluetooth devices include the Bluetooth car kit, the Bluetooth speaker, and the Bluetooth head-set. The Bluetooth car kit and the Bluetooth speaker are suitable for playing Bluetooth data for the driver and passengers and the privacy is low, while the Bluetooth head-set is suitable for playing Bluetooth data for the driver and the privacy is high. In this embodiment, the privacy of the Bluetooth car kit is set to the lowest while the privacy of the Bluetooth head-set is set to the highest, so that the first priority may be obtained as follows: the priority of the Bluetooth car kit is higher than the priority of the Bluetooth speaker, and the priority of the Bluetooth speaker is higher than the priority of the Bluetooth head-set.

Figure 2:
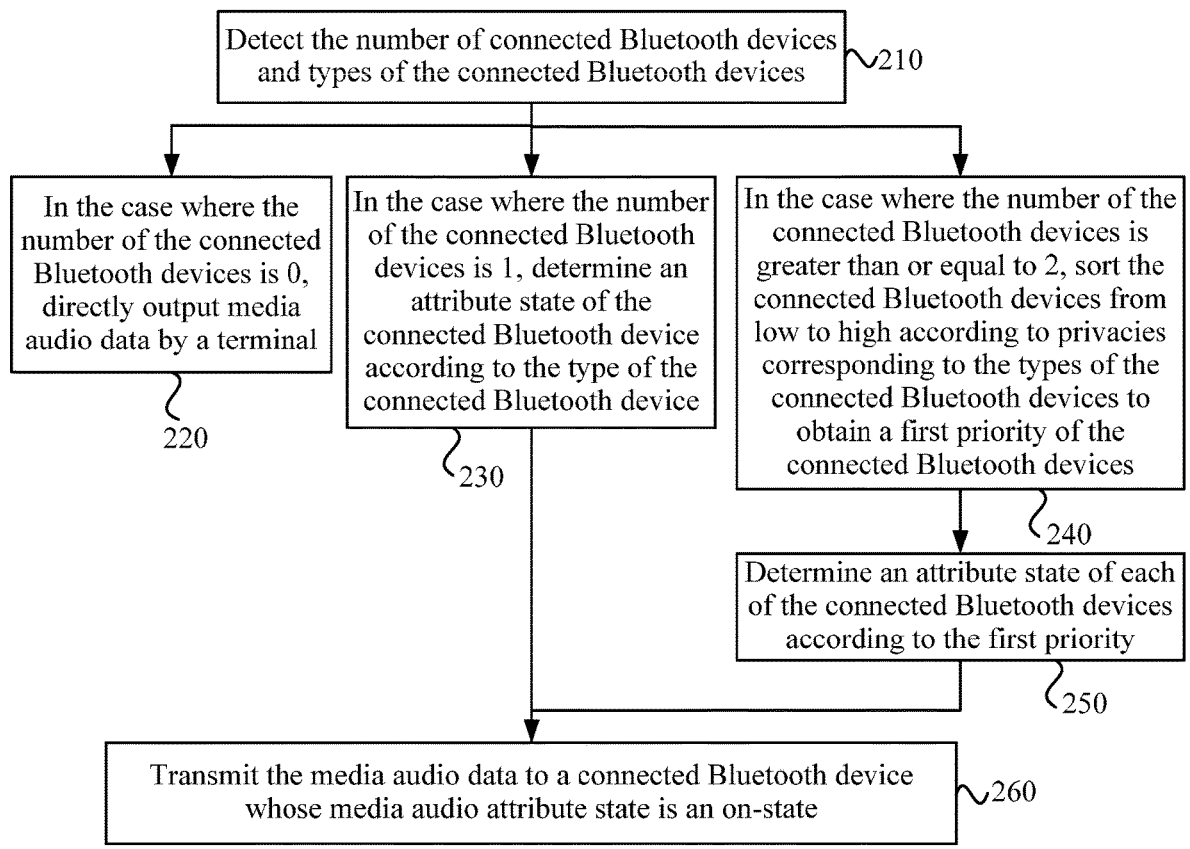
FIG. 2 is a flowchart of a media audio data transmission method according to an embodiment.

In an embodiment, it may be understood that the higher the privacy of the Bluetooth device, the lower the shareability. For example, the Bluetooth car kit and the Bluetooth speaker may play Bluetooth data for both the driver and passengers with the high shareability while the Bluetooth head-set is suitable for playing Bluetooth data for the driver with the low shareability. In this case, the connected Bluetooth devices are sorted from high to low according to the shareability corresponding to the types of the connected Bluetooth devices to obtain the first priority of the connected Bluetooth devices. FIG. 2 is a flowchart of a media audio data transmission method according to an embodiment. As shown in FIG. 2, the method provided by this embodiment includes steps 210 to 260.

In Step 210, the number of connected Bluetooth devices and types of the connected Bluetooth devices are detected.

In Step 220, in the case where the number of the connected Bluetooth devices is 0, media audio data is directly outputted by a terminal, for example, the media audio data may be played through the mobile phone head-set.

In Step 230, in the case where the number of the connected Bluetooth devices is 1, an attribute state of the connected Bluetooth device is determined according to the type of the connected Bluetooth device. For example, in the case where paired device=[1], [5], [6] or [7], the media audio attribute state of the connected Bluetooth device is set to the off-state so that the media audio data is directly outputted by the terminal; in the case where paired device=[2], [3] or [4], the media audio attribute state of the connected Bluetooth device is kept to be the on-state so that the media audio data is transmitted to the connected Bluetooth device for playing.

In Step 240, in the case where the number of the connected Bluetooth devices is greater than or equal to 2, the connected Bluetooth devices are sorted from low to high according to privacies corresponding to the types of the connected Bluetooth devices to obtain a first priority of the connected Bluetooth devices.

In Step 250, an attribute state of each of the connected Bluetooth devices is determined according to the first priority.

The attribute state includes a media audio attribute state, and the number of the connected Bluetooth devices as 2 is taken as an example, that is, paired device=[X, Y]. For example, in the case where X∉{2, 3, 4} and Y∉{2, 3, 4}, the media audio attribute states of the two connected Bluetooth devices are set to the off-state so that the media audio data is directly outputted by the terminal. For example, in the case where X∈{2, 3, 4} and Y∈{2, 3, 4}, the media audio attribute state of the connected Bluetooth device X is set to the off-state while the media audio attribute state of the connected Bluetooth device Y is kept to be the on-state so that the media audio data is transmitted to the connected Bluetooth device Y for playing. For example, in the case where Y∉{2, 3, 4} and X∈{2, 3, 4}, the media audio attribute state of the connected Bluetooth device Y is set to the off-state while the media audio attribute state of the connected Bluetooth device X is kept to be the on-state so that the media audio data is transmitted to the connected Bluetooth device X for playing. For example, in the case where X∈{2, 3, 4}, Y∈{2, 3, 4} and X=Y, the media audio attribute state of the last-connected Bluetooth device is kept to be the on-state while the media audio attribute state of the non-last-connected Bluetooth device is set to the off-state so that the media audio data is transmitted to the last-connected Bluetooth device for playing, in this case, it may also be understood that for the connected Bluetooth devices of the same type, the priority of the last-connected Bluetooth device is higher than the priority of the non-last-connected Bluetooth device. For example, in the case where X∈{2, 3, 4}, Y∈{2, 3, 4} and X≠Y, the connected Bluetooth devices X and Y are sorted from low to high according to privacies corresponding to the types of the connected Bluetooth devices to obtain the first priority, and the media audio data is transmitted to the Bluetooth device with the highest priority among [X] and [Y] for playing according to the first priority. For example, if the privacy of the Bluetooth car kit is lower than the privacy of the Bluetooth speaker and the privacy of the Bluetooth speaker is lower than the privacy of the Bluetooth head-set, the first priority is as follows: the priority of the Bluetooth car kit>the priority of the Bluetooth speaker>the priority of the Bluetooth head-set. For example, in the case where X=2 (Bluetooth head-set) and Y=3 (Bluetooth speaker), the media audio attribute state of the Bluetooth head-set is set to the off-state so that the media audio data is transmitted to the Bluetooth speaker for playing. In another example, in the case where X=4 (Bluetooth car kit) and Y=3, the media audio attribute state of the Bluetooth speaker is set to the off-state so that the media audio data is transmitted to the Bluetooth car kit for playing.

In Step 260, the media audio data is transmitted to a connected Bluetooth device whose media audio attribute state is the on-state.

In the examples described above, the media audio attribute states of Bluetooth devices whose priority is not the highest among the connected Bluetooth devices are set to the off-state so that the media audio data is transmitted to the Bluetooth device with the highest priority among the connected Bluetooth devices for playing, thus satisfying the requirements of data sharing. In this case, if the types of the connected Bluetooth devices are the same, the media audio attribute state of the last-connected Bluetooth device is kept to be the on-state while the media audio attributes of the non-last-connected Bluetooth devices are set to the off-state so that the media audio data is transmitted to the last-connected Bluetooth device for playing.

In this embodiment, the media audio attribute states and the phone call attribute states of the connected Bluetooth devices are set to the on-state by default so that different types of data are transmitted and played at any time according to the default channels. For a Bluetooth device that needs to transmit the media audio data, the media audio attribute state of the Bluetooth device is kept to be the on-state, while for a Bluetooth device that does not need to transmit the media audio data, the media audio attribute state of the Bluetooth device is set to the off-state.

In this embodiment, the first priority includes that: the priority of the Bluetooth car kit>the priority of the Bluetooth speaker>the priority of the Bluetooth head-set>the priority of the terminal itself>the priority of other types of Bluetooth devices, where other types of Bluetooth devices refer to Bluetooth devices that cannot be set to play media audio data or phone call data, such as Bluetooth keyboards, Bluetooth adapters, and the like.

In an embodiment, Step 120 includes the following step: in the case where the number of the connected Bluetooth devices is greater than or equal to 2 and not all of the types of the connected Bluetooth devices are identical, an attribute state of each of the connected Bluetooth devices is determined according to a second priority. In this embodiment, the attribute state includes a phone call attribute state, and the to-be-outputted Bluetooth data is phone call data generated according to a phone call instruction.

In this embodiment, the step in which the attribute state of each of the connected Bluetooth devices is determined according to the second priority includes the following step: phone call attribute states of Bluetooth devices except a Bluetooth device with the highest priority among the connected Bluetooth devices are set to the off-state according to the second priority.

In an embodiment, before Step 120, the method further includes the following step: the connected Bluetooth devices are sorted from high to low according to privacies corresponding to the types of the connected Bluetooth devices to obtain the second priority of the connected Bluetooth devices. For example, the connected Bluetooth devices include the Bluetooth car kit, the Bluetooth speaker, and the Bluetooth head-set. Since the privacy of the Bluetooth car kit is the lowest while the privacy of the Bluetooth head-set is the highest, the obtained second priority may be as follows: the priority of the Bluetooth head-set is higher than the priority of the Bluetooth car kit, and the priority of the Bluetooth car kit is higher than the priority of the Bluetooth speaker.

In an embodiment, the connected Bluetooth devices are sorted from low to high according to the shareability corresponding to the types of the connected Bluetooth devices to obtain the second priority of the connected Bluetooth devices.

Figure 3:
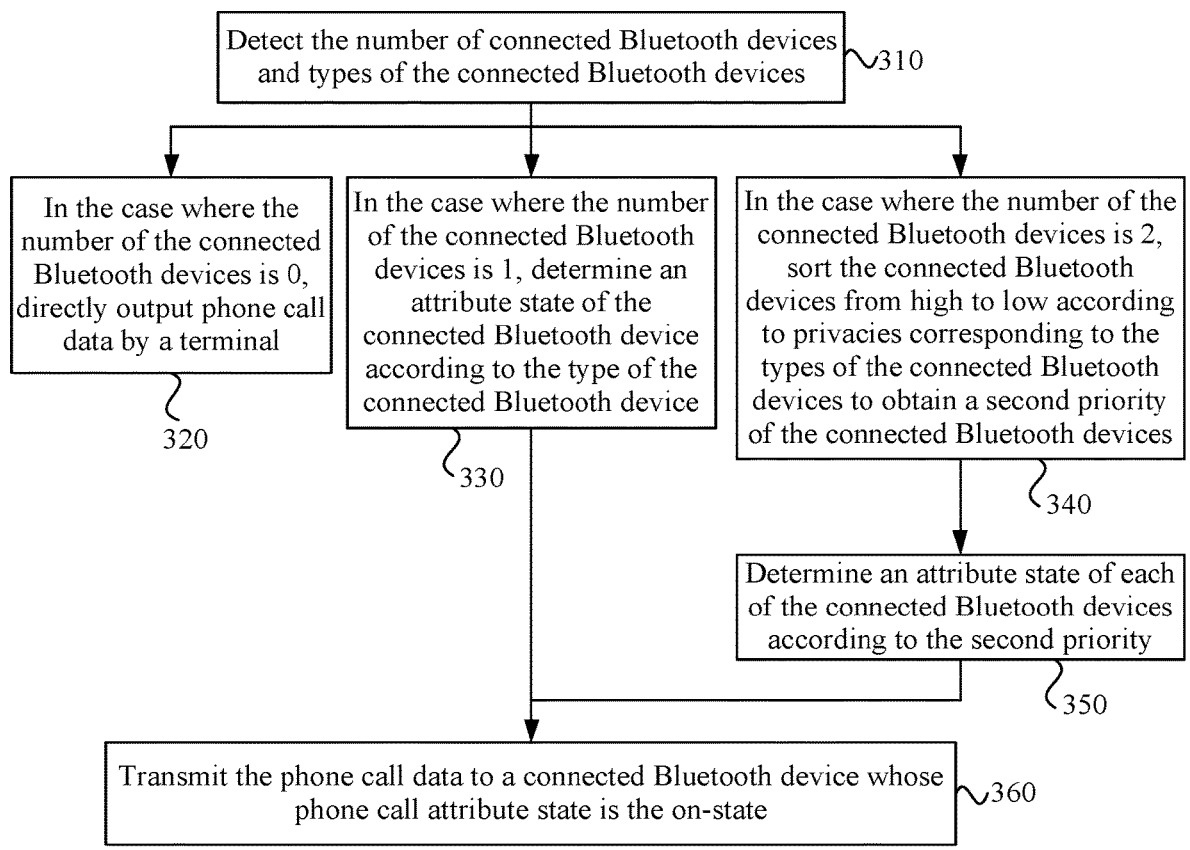
FIG. 3 is a flowchart of a phone call data transmission method according to an embodiment.

FIG. 3 is a flowchart of a phone call data transmission method according to an embodiment. As shown in FIG. 3, the method provided by this embodiment includes steps 310 to 360.

In Step 310, the number of connected Bluetooth devices and types of the connected Bluetooth devices are detected.

In Step 320, in the case where the number of the connected Bluetooth devices is 0, phone call data is directly outputted by a terminal, for example, the phone call data may be played through the mobile phone head-set.

In Step 330, in the case where the number of the connected Bluetooth devices is 1, an attribute state of the connected Bluetooth device is determined according to the type of the connected Bluetooth device. For example, in the case where paired device=[1], [5], [6] or [7], the phone call attribute state of the connected Bluetooth device is set to the off-state so that the phone call data is directly outputted by the terminal; in the case where paired device=[2], [3] or [4], the phone call attribute state of the connected Bluetooth device is kept to be the on-state so that the phone call data is transmitted to the connected Bluetooth device for playing.

In Step 340, in the case where the number of the connected Bluetooth devices is 2, the connected Bluetooth devices are sorted from high to low according to privacies corresponding to the types of the connected Bluetooth devices to obtain the second priority of the connected Bluetooth devices.

In Step 350, an attribute state of each of the connected Bluetooth devices is determined according to the second priority.

The attribute state includes the phone call attribute state, and the number of the connected Bluetooth devices as 2 is taken as an example, that is, paired device=[X, Y]. For example, in the case where $X \notin \{2, 3, 4\}$ and $Y \notin \{2, 3, 4\}$, the phone call attribute states of the two connected Bluetooth devices are set to the off-state so that the phone call data is directly outputted by the terminal. For example, in the case where $X \notin \{2, 3, 4\}$ and $Y \in \{2, 3, 4\}$, the phone call attribute state of the connected Bluetooth device X is set to the off-state while the phone call attribute state of the connected Bluetooth device Y is kept to be the on-state so that the phone call data is transmitted to the connected Bluetooth device Y for playing. For example, in the case where $Y \notin \{2, 3, 4\}$ and $X \in \{2, 3, 4\}$, the phone call attribute state of the connected Bluetooth device Y is set to the off-state while the phone call attribute state of the connected Bluetooth device X is kept to be the on-state so that the phone call data is transmitted to the connected Bluetooth device X for playing. For example, in the case where $X \in \{2, 3, 4\}$, $Y \in \{2, 3, 4\}$, and X=Y, the phone call attribute state of the last-connected Bluetooth device is kept to be the on-state while the phone call attribute state of the non-last-connected Bluetooth device is set to the off-state so that the phone call data is transmitted to the last-connected Bluetooth device for playing, in this case, it may also be understood that for the connected Bluetooth devices of the same type, the priority of the last-connected Bluetooth device is higher than the priority of the non-last-connected Bluetooth device. For example, in the case where $X \in \{2, 3, 4\}$, $Y \in \{2, 3, 4\}$, and $X \neq Y$, the connected Bluetooth devices X and Y are sorted from high to low according to privacies corresponding to the types of the connected Bluetooth devices to obtain the second priority, and the phone call data is transmitted to the Bluetooth device with the highest priority among [X] and [Y] for playing according to the second priority. For example, the privacy of the Bluetooth car kit is lower than the privacy of the Bluetooth speaker and the privacy of the Bluetooth speaker is lower than the privacy of the Bluetooth head-set, the second priority is as follows: the priority of the Bluetooth head-set>the priority of the Bluetooth car kit>the priority of the Bluetooth speaker. For example, in the case where X=2 (Bluetooth head-set) and Y=3 (Bluetooth speaker), the phone call attribute state of the Bluetooth speaker is set to the off-state so that the phone call data is transmitted to the Bluetooth head-set for playing. In another example, in the case where X=4 (Bluetooth car kit) and Y=3, the phone call attribute state of the Bluetooth speaker is set to the off-state so that the phone call data is transmitted to the Bluetooth car kit for playing.

In Step 360, the phone call data is transmitted to a connected Bluetooth device whose phone call attribute state is the on-state.

In the examples described above, the phone call attribute states of Bluetooth devices whose priority is not the highest among the connected Bluetooth devices are set to the off-state so that the phone call data is transmitted to the Bluetooth device with the highest priority among the connected Bluetooth devices for playing, thus satisfying the requirements of data privacy. In this case, if the types of the connected Bluetooth devices are the same, the phone call attribute state of the last-connected Bluetooth device is kept to be the on-state while the phone call attributes of the non-last-connected Bluetooth devices are set to the off-state so that the phone call data is transmitted to the last-connected Bluetooth device for playing.

In this embodiment, the media audio attribute states and the phone call attribute states of the connected Bluetooth devices are set to the on-state by default so that different types of data are transmitted and played according to the default channels. For a Bluetooth device that needs to transmit the phone call data, the phone call attribute state of the Bluetooth device is kept to be the on-state, while for a Bluetooth device that does not need to transmit the phone call data, the phone call attribute state of the Bluetooth device is set to the off-state.

In this embodiment, the second priority includes that: the priority of the Bluetooth head-set>the priority of the Bluetooth car kit>the priority of the Bluetooth speaker>the priority of the terminal itself>the priority of other types of Bluetooth devices, where other types of Bluetooth devices refer to Bluetooth devices that cannot be set to play media audio data or phone call data, such as Bluetooth keyboards, Bluetooth adapters, and the like.

In the embodiments described above, in the case where the number of the connected Bluetooth devices is greater than or equal to 2 and the types of the connected Bluetooth devices are all identical, the attribute state of the last-connected Bluetooth device among the connected Bluetooth devices is set to the on-state, and attribute states of non-last-connected Bluetooth devices among the connected Bluetooth devices are set to the off-state.

In the embodiments described above, the attribute states of the connected Bluetooth devices are the on-state by default.

In an embodiment, the default attribute states of the connected Bluetooth devices are not limited, and in the case of receiving the media audio playing instruction or the phone call instruction, the attribute states of the connected Bluetooth devices are set according to the number of the connected Bluetooth devices and the types of the connected Bluetooth devices.

The embodiments described above are illustrated in the scenario where Bluetooth devices are applied. In the case where the terminal is connected to both the Bluetooth device and a wired device at the same time, the to-be-outputted Bluetooth data may be played through the last-connected device between the Bluetooth device and the wired device.

In an embodiment, the to-be-outputted Bluetooth data includes at least one of the media audio data or the phone call data, and the attribute state includes the media audio attribute state and the phone call attribute state. In this embodiment, Step 130 includes the following step: the media audio data is transmitted to a connected Bluetooth device whose media audio attribute state is an on-state, and the phone call data is transmitted to a connected Bluetooth device whose phone call attribute state is an on-state. For example, in the case of receiving a media audio playing instruction, the audio and video data to be played is the to-be-outputted Bluetooth data. Among the connected Bluetooth devices connected to the terminal, the media audio attribute state of the Bluetooth head-set is the off-state while the media audio attribute state of the Bluetooth car kit is the on-state, and then the terminal transmits the to-be-outputted Bluetooth data to the Bluetooth car kit to play the audio and video through the Bluetooth car kit. In another example, in the case of receiving a phone call instruction, the incoming ring tone, the outgoing ring tone, the phone call content, and the like are the to-be-outputted Bluetooth data. Among the connected Bluetooth devices connected to the terminal, the phone call attribute state of the Bluetooth head-set is the on-state while the phone call attribute state of the Bluetooth car kit is the off-state, and then the terminal transmits the to-be-outputted Bluetooth data to the Bluetooth head-set and to make a phone call through the Bluetooth head-set.

In an embodiment, the connected Bluetooth devices include a first device and a second device, the privacy of the first device is lower than the privacy of the second device, and the attribute state includes the media audio attribute state and the phone call attribute state. For example, the first device may be the Bluetooth car kit, and the second device may be the Bluetooth head-set.

In this embodiment, Step 120 includes the following step: in the case of receiving a phone call instruction, the phone call attribute state of the first device is set to the off-state; in the case of receiving a media audio playing instruction, the media audio attribute state of the second device is set to the off-state. The attribute states of the first device and the second device are the on-state by default, and there are at least one first device and at least one second device. In the case that there are multiple connected Bluetooth devices of the same type, only the Bluetooth device that is connected to the terminal last among this type of connected Bluetooth devices may receive the corresponding to-be-outputted Bluetooth data.

Figure 4:
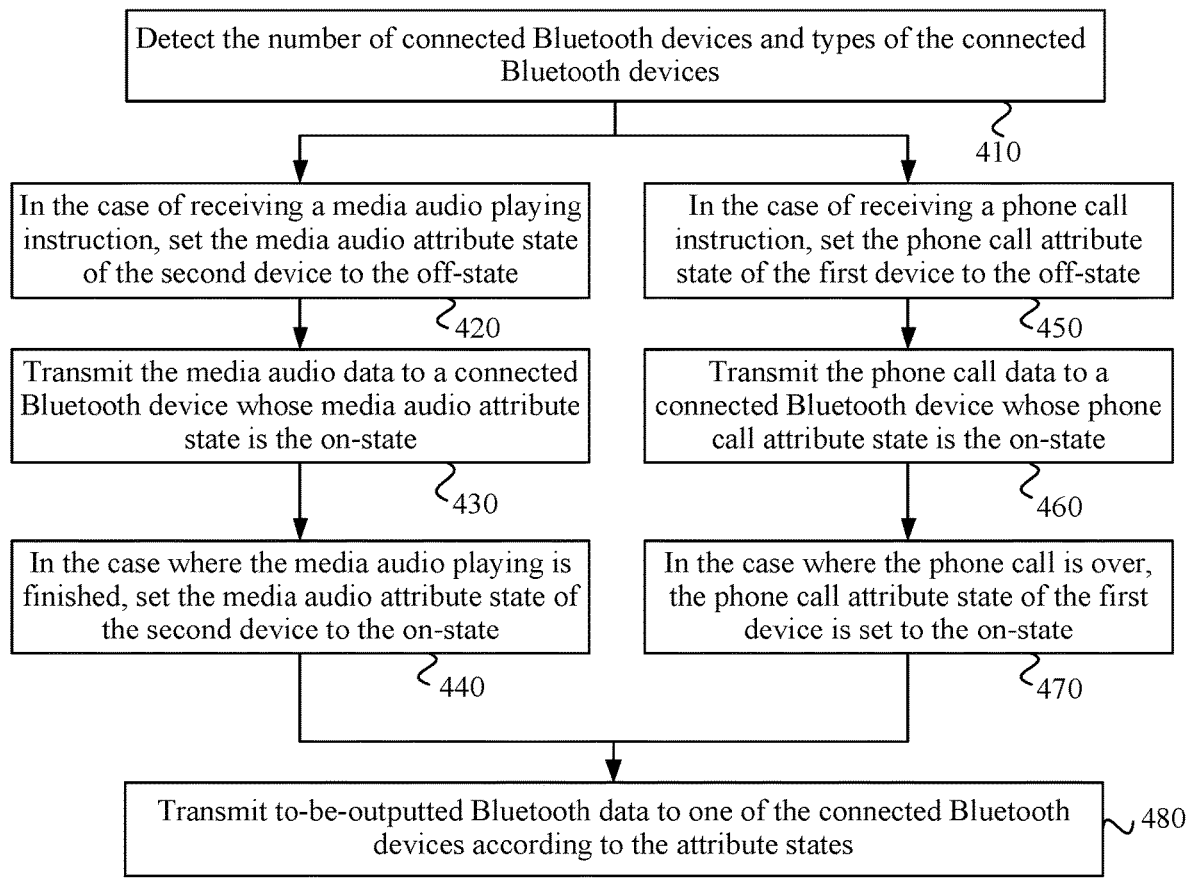
FIG. 4 is a flowchart of another Bluetooth data transmission method according to an embodiment.

FIG. 4 is a flowchart of another Bluetooth data transmission method according to an embodiment. As shown in FIG. 4, the method provided by this embodiment includes steps 410 to 480.

In Step 410, the number of connected Bluetooth devices and types of the connected Bluetooth devices are detected. In this embodiment, the terminal is connected to the first device and the second device at the same time, and the privacy of the first device is lower than the privacy of the second device, where the first device may be the Bluetooth car kit, and the second device may be the Bluetooth head-set. The number of the connected Bluetooth devices is 2, that is, paired device=[2, 4], and in an initial state, the attribute states of the first device and the second device are the on-state.

In Step 420, in the case of receiving a media audio playing instruction, the media audio attribute state of the second device is set to the off-state. In this step, according to the privacies corresponding to the types of devices, the media audio data is transmitted to the first device for playing first. The phone call attribute and the media audio attribute of the first device are kept to be the on-state, and the phone call attribute of the second device may also be kept to be the on-state, but the media audio attribute state of the second device is set to the off-state. Then Step 430 is executed.

In Step 430, the media audio data is transmitted to a connected Bluetooth device whose media audio attribute state is the on-state. The media audio data is outputted through the first device, the second device does not output any media audio data, and all passengers in the car may listen to the media audio data shared by the terminal.

In Step 440, in the case where the media audio playing is finished, the media audio attribute state of the second device is set to the on-state. In the case where no Bluetooth device with a higher priority may be set to output the media audio data (for example, the terminal is not connected to the first device or disconnected from the first device), the second device may be set to play the media audio at any time.

In Step 450, in the case of receiving a phone call instruction, the phone call attribute state of the first device is set to the off-state. For example, in the case of answering an incoming phone call and dialing a number in the process of playing the audio and video, the phone call data is transmitted to the second device for playing first. The media audio attribute of the second device has been turned off, and the phone call attribute of the second device continues to be kept in the on-state, while the media audio attribute of the first device is kept in the on-state, but the phone call attribute state of the first device is set to the off-state. In this manner, the phone call data is transmitted to the second device for outputting, and the first device may continue to play the audio and video.

In Step 460, the phone call data is transmitted to a connected Bluetooth device whose phone call attribute state is the on-state. The phone call data is outputted through the second device, the first device does not output any phone call data, and the driver may make phone calls through the second device so as to guarantee the phone call privacy.

In Step 470, in the case where the phone call is over, the phone call attribute state of the first device is set to the on-state. In the case where no Bluetooth device with a higher priority may be set to output the phone call data (for example, the terminal is not connected to the second device or disconnected from the second device), the first device may be set to make a phone call at any time.

In Step 480, the to-be-outputted Bluetooth data is transmitted to the corresponding connected Bluetooth device according to the attribute states.

In this embodiment, the driver may use the second device to answer the phone and may also simultaneously play the media audio for other passengers in the car through the first device. The phone call may be made in parallel with the playing of the media audio without interfering with each other, thereby improving the transmission flexibility of different types of data between different Bluetooth devices and improving the user experience.

In the embodiments described above, in the case of receiving a media audio playing instruction, the first priority may also be determined according to the privacies or shareabilities corresponding to the types of the connected Bluetooth devices, and the media audio attribute states of the Bluetooth devices whose priority is not the highest are set to the off-state; in the case of receiving a phone call instruction, the second priority may also be determined according to the privacies or shareabilities corresponding to the types of the connected Bluetooth devices, and the phone call attribute states of the Bluetooth devices whose priority is not the highest are set to the off-state, thereby achieving the independent transmission of phone call data and media audio data and the independent implementation of phone call making and media audio playing.

In the embodiments described above, the attribute states of the connected Bluetooth devices are the on-state by default. In the case where the media audio playing is finished, the media audio attribute states of the Bluetooth devices whose priority is not the highest are set (restored) to the on-state according to the first priority; in the case where the phone call is over, the phone call attribute states of the Bluetooth devices whose priority is not the highest are set (restored) to the on-state according to the second priority, thus ensuring that the connected Bluetooth devices can be set to make a call or play media audio at any time.

In an embodiment, the method further includes the following steps: a to-be-paired Bluetooth device is detected; in the case where the number of the connected Bluetooth devices is less than the maximum connection number, an attempt is made to establish a connection with the detected to-be-paired Bluetooth device; and in the case where the number of the connected Bluetooth devices is not less than the maximum connection number, a refusal is made to establish the connection with the detected to-be-paired Bluetooth device; where the maximum connection number is determined according to information of candidate maximum connection numbers configured by a user.

In an embodiment, the method further includes the following steps: after establishing the connection with the detected to-be-paired Bluetooth device, the number of the connected Bluetooth devices is updated, and the type of the detected to-be-paired Bluetooth device is recorded.

Figure 5:
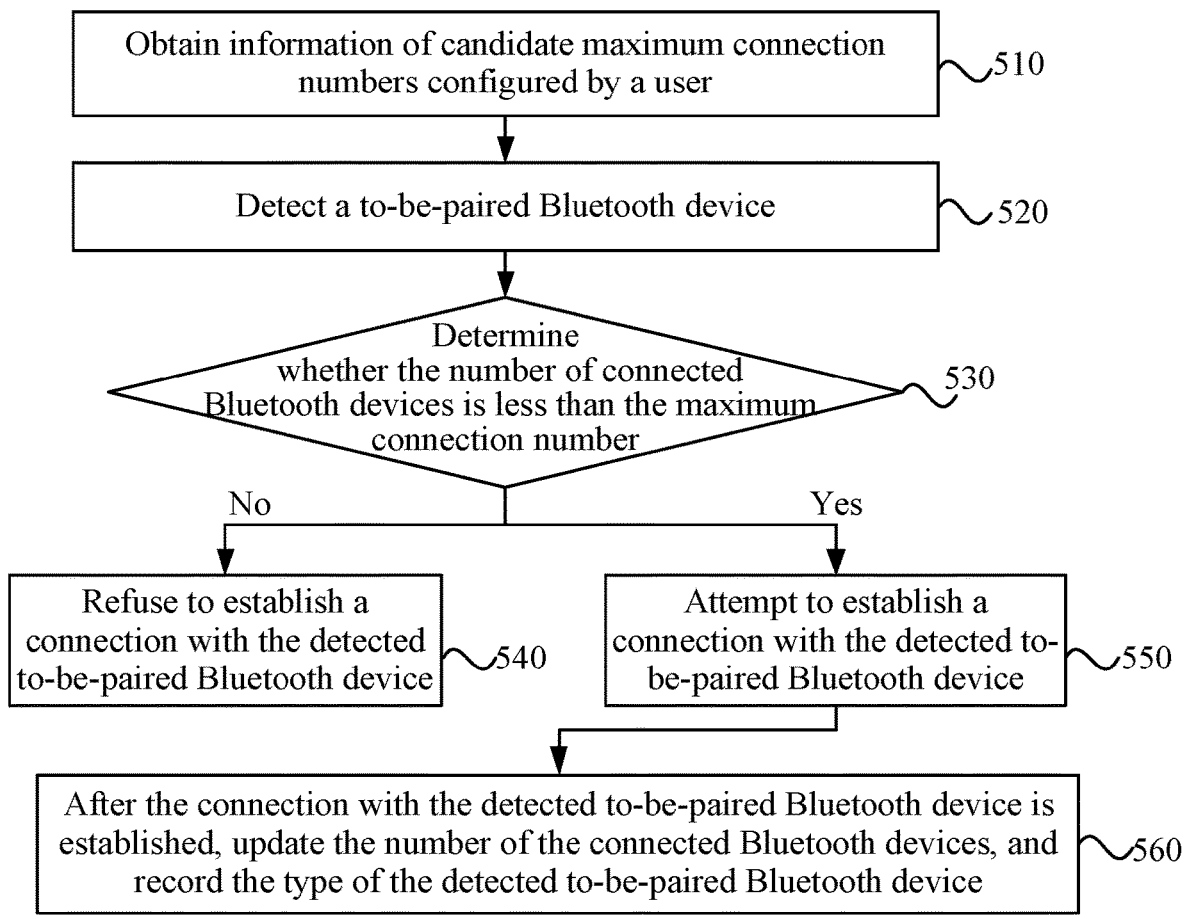
FIG. 5 is a flowchart of determining the number and types of connected Bluetooth devices according to an embodiment.

FIG. 5 is a flowchart of determining the number and types of connected Bluetooth devices according to an embodiment. As shown in FIG. 5, the method provided by this embodiment includes steps 510 to 560.

In step 510, information of candidate maximum connection numbers configured by a user is obtained. In this embodiment, the maximum connection number may be configured by the user. For example, the user selects the maximum connection number from candidate options on the configuration interface of the terminal.

In Step 520, a to-be-paired Bluetooth device is detected.

In Step 530, whether the number of connected Bluetooth devices is less than the maximum connection number is determined, and if the number of the connected Bluetooth devices is less than the maximum connection number, Step 550 is executed; and if the number of the connected Bluetooth devices is not less than the maximum connection number, Step 540 is executed.

In Step 540, a refusal is made to establish a connection with the detected to-be-paired Bluetooth device. In this embodiment, if the number of the connected Bluetooth devices is equal to the maximum connection number, the Bluetooth connection may no longer be established with the detected to-be-paired Bluetooth device.

In Step 550, an attempt is made to establish a connection with the detected to-be-paired Bluetooth device.

In Step 560, after the connection with the detected to-be-paired Bluetooth device is established, the number of the connected Bluetooth devices is updated, and the type of the detected to-be-paired Bluetooth device is recorded. In this embodiment, the number of the connected Bluetooth devices is initially 0, and every time the connection with the detected to-be-paired Bluetooth device is established, the number of connected Bluetooth devices is increased by 1, and the type of the detected to-be-paired Bluetooth device is recorded as the basis for determining the attribute state of the connected Bluetooth device.

Figure 6:
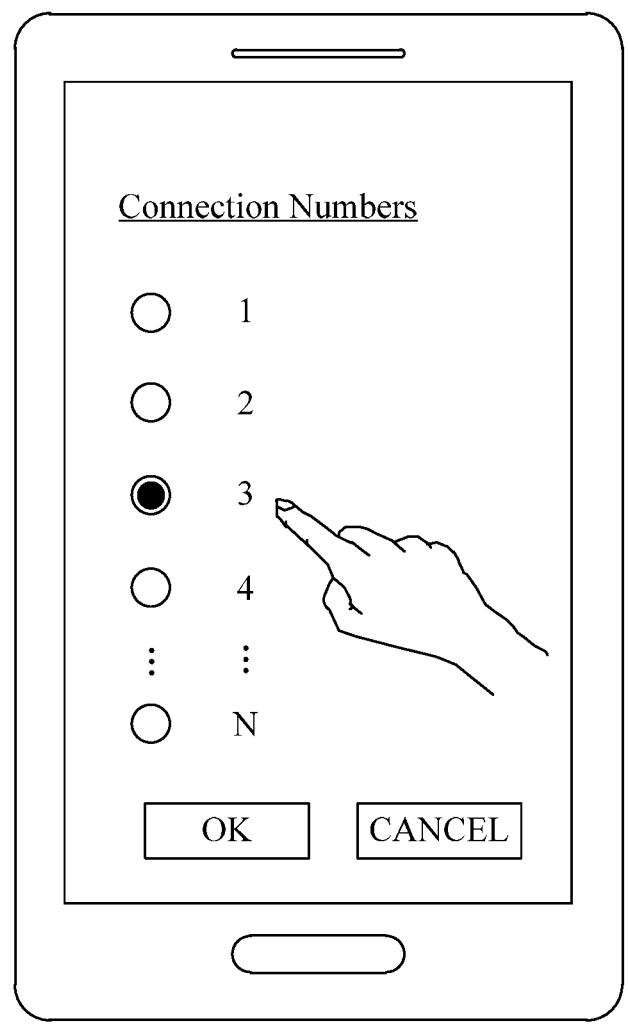
FIG. 6 is a schematic diagram of configuring the maximum connection number according to an embodiment.

FIG. 6 is a schematic diagram of configuring the maximum connection number according to an embodiment. In this embodiment, the user may select the maximum connection number from the candidate options or input the maximum connection number on the configuration interface of the terminal. The maximum connection number is controlled by adding the configuration item of maximum connection numbers (Connection Numbers) in the software underlying connection events (Connection Events). In the case where the user does not configure the maximum connection number, the maximum connection number is a preset value by default. The default value of Connection Numbers is N, which means that the terminal may be connected to N Bluetooth devices at the same time, including Bluetooth head-sets, Bluetooth car kits, Bluetooth speakers, and other related devices. Connected Numbers indicates the number of connected Bluetooth devices.

As shown in FIG. 6, the user clicks Connection Numbers to configure the maximum connection number, and a radio button pops up including candidate options of 1 to N. For example, in the case where the user selects Connection Numbers to be 3, the terminal sends an instruction to Connection Events to set or modify Connection Numbers to be 3. In the case where the terminal is not connected to any Bluetooth device, Connected Number=0; in the case where the terminal establishes a connection with the first Bluetooth device, Connected Number=1; and so on, until Connected Number=Connection Numbers, and then the terminal refuses to establish a connection with the detected Bluetooth device. If the terminal is disconnected from one of the connected Bluetooth devices, the value of Connected Number is minus 1. In the process in which the terminal is connected to the Bluetooth devices, whether the detected Bluetooth device may be continuously connected is determined according to whether the value of Connected Number is less than the value of Connection Numbers.

Figure 7:
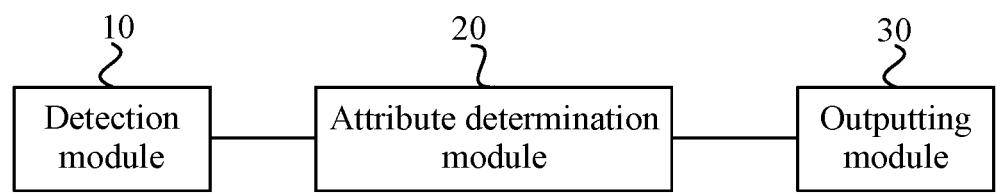
FIG. 7 is a structural diagram of a Bluetooth data transmission apparatus according to an embodiment.

An embodiment of the present application further provides a Bluetooth data transmission apparatus. FIG. 7 is a structural diagram of a Bluetooth data transmission apparatus according to an embodiment. As shown in FIG. 7, the apparatus includes a detection module 10, an attribute determination module 20, and an outputting module 30.

The detection module 10 is configured to detect the number of connected Bluetooth devices and types of the connected Bluetooth devices.

The attribute determination module 20 is configured to determine attribute states of the connected Bluetooth devices according to the number of the connected Bluetooth devices and the types of the connected Bluetooth devices.

The outputting module 30 is configured to transmit to-be-outputted Bluetooth data to the corresponding connected Bluetooth device according to the attribute states.

In an embodiment, the attribute determination module 20 is configured to, in the case where the number of the connected Bluetooth devices is greater than or equal to 2 and not all of the types of the connected Bluetooth devices are identical, determine an attribute state of each of the connected Bluetooth devices according to a first priority; where the attribute state includes a media audio attribute state, and the to-be-outputted Bluetooth data is media audio data generated according to a media audio playing instruction.

In an embodiment, the operation of determining the attribute state of each of the connected Bluetooth devices according to the first priority includes the following operation.

Media audio attribute states of Bluetooth devices except a Bluetooth device with the highest priority among the connected Bluetooth devices are set to an off-state according to the first priority.

In an embodiment, the apparatus further includes a first priority determination module.

The first priority determination module is configured to, before the attribute states of the connected Bluetooth devices are determined according to the number of the connected Bluetooth devices and the types of the connected Bluetooth devices, sort the connected Bluetooth devices from low to high according to privacies corresponding to the types of the connected Bluetooth devices to obtain the first priority of the connected Bluetooth devices.

In an embodiment, the attribute determination module 20 is further configured to, in the case where the number of the connected Bluetooth devices is greater than or equal to 2 and not all of the types of the connected Bluetooth devices are identical, determine an attribute state of each of the connected Bluetooth devices according to a second priority; where the attribute state includes a phone call attribute state, and the to-be-outputted Bluetooth data is phone call data generated according to a phone call instruction.

In an embodiment, the operation of determining the attribute state of each of the connected Bluetooth devices according to the second priority includes the following operation.

Phone call attribute states of Bluetooth devices except a Bluetooth device with the highest priority among the connected Bluetooth devices are set to an off-state according to the second priority.

In an embodiment, the apparatus further includes a second priority determination module.

The second priority determination module is configured to, before the attribute states of the connected Bluetooth devices are determined according to the number of the connected Bluetooth devices and the types of the connected Bluetooth devices, sort the connected Bluetooth devices from high to low according to privacies corresponding to the types of the connected Bluetooth devices to obtain the second priority of the connected Bluetooth devices.

In an embodiment, the attribute determination module 20 is configured to, in the case where the number of the connected Bluetooth devices is greater than or equal to 2 and the types of the connected Bluetooth devices are all identical, set an attribute state of a last-connected Bluetooth device among the connected Bluetooth devices to an on-state, and set attribute states of non-last-connected Bluetooth devices among the connected Bluetooth devices to an off-state.

In an embodiment, the connected Bluetooth devices include a first device and a second device, the privacy of the first device is lower than the privacy of the second device, and the attribute state includes a media audio attribute state and a phone call attribute state.

The attribute determination module 20 is configured to, in the case of receiving a phone call instruction, set the phone call attribute state of the first device to an off-state; and in the case of receiving a media audio playing instruction, set the media audio attribute state of the second device to an off-state.

In an embodiment, the to-be-outputted Bluetooth data includes at least one of the media audio data or the phone call data, and the attribute state includes the media audio attribute state and the phone call attribute state.

Accordingly, the outputting module 30 is configured to perform at least one of:

transmitting the media audio data to a connected Bluetooth device whose media audio attribute state is an on-state; or transmitting the phone call data to a connected Bluetooth device whose phone call attribute state is an on-state.

In an embodiment, the attribute states of the connected Bluetooth devices are an on-state by default.

In an embodiment, the apparatus further includes a device detection module and a connection module.

The device detection module is configured to detect a to-be-paired Bluetooth device.

The connection module is configured to, in the case where the number of the connected Bluetooth devices is less than the maximum connection number, attempt to establish a connection with the detected to-be-paired Bluetooth device; and in the case where the number of the connected Bluetooth devices is not less than the maximum connection number, refuse to establish a connection with the detected to-be-paired Bluetooth device; where the maximum connection number is determined according to information of candidate maximum connection numbers configured by a user.

In an embodiment, the apparatus further includes an updating module.

The updating module is configured to, after the connection is established with the detected to-be-paired Bluetooth device, update the number of the connected Bluetooth devices and record the type of the detected to-be-paired Bluetooth device.

The Bluetooth data transmission apparatus provided in this embodiment optimizes the protocol attributes supported by the Bluetooth devices according to the number of the connected Bluetooth devices and the types of the connected Bluetooth devices, distinguishes the media audio data from the phone call data, and transmits different types of data to different Bluetooth devices for outputting without affecting each other, thereby improving the transmission flexibility of different types of data between different Bluetooth devices and improving the user experience.

Figure 8:
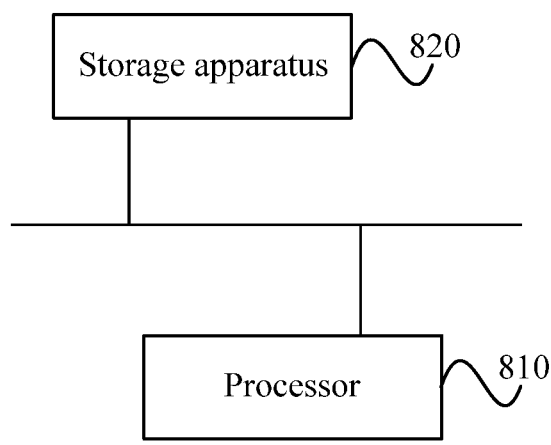
FIG. 8 is a structural diagram of a device according to an embodiment.

FIG. 8 is a structure diagram of a terminal according to an embodiment. The terminal may be an intelligent terminal such as a desktop computer, a notebook computer, a smartphone, a tablet computer, and the like. As shown in FIG. 8, this embodiment provides a terminal. The terminal includes a processor 810 and a storage apparatus 820. The number of processors in the terminal may be one or more, and one processor 810 is taken as an example in FIG. 8. The processor 810 and the storage apparatus 820 in the terminal may be connected via a bus or in other manners, with connection via a bus as an example in FIG. 8.

When the one or more programs are executed by the one or more processors 810, the one or more processors are caused to implement the Bluetooth data transmission method described in any one of the embodiments of the present application.

As a computer-readable storage medium, the storage apparatus 820 in the terminal can be configured to store one or more programs. The programs may be software programs, computer-executable programs and modules thereof, such as program instructions/modules corresponding to the Bluetooth data transmission method in the embodiments of the present application (for example, modules in the Bluetooth data transmission apparatus shown in FIG. 7, including the detection module 10, the attribute determination module 20, and the outputting module 30). The processor 810 runs the software programs, instructions, and modules stored in the storage apparatus 820 to execute function applications and data processing of the terminal, that is, to implement the Bluetooth data transmission method in the method embodiments described above.

The storage apparatus 820 mainly includes a program storage area and a data storage area. The program storage area may store an application program required for operating at least one function. The data storage area may store data created depending on the use of a device (for example, the to-be-outputted Bluetooth data and the attribute state in the embodiments described above). Additionally, the storage apparatus 820 may include a high-speed random access memory, and may further include a nonvolatile memory such as at least one storage device, a flash memory or other nonvolatile solid-state memories. In some examples, the storage apparatus 820 may include memories which are remotely disposed with respect to the processors 810. These remote memories may be connected to the terminal via a network. The examples of the preceding network include, but are not limited to, the Internet, an intranet, a local area network, a mobile communication network, and a combination thereof.

The one or more programs included in the preceding terminal, when executed by one or more processors 810, implement the following operations: detecting the number of connected Bluetooth devices and types of connected Bluetooth devices; determining, according to the number of connected Bluetooth devices and types of the connected Bluetooth devices, attribute states of the connected Bluetooth devices; and transmitting to-be-outputted Bluetooth data to the corresponding connected Bluetooth devices according to the attribute states.

The terminal provided in this embodiment and the Bluetooth data transmission method provided in any one of the embodiments described above belong to the same concept. For technical details not described in detail in this embodiment, reference may be made to any one of the embodiments described above. The terminal has the same beneficial effects as the Bluetooth data transmission method.

An embodiment of the present application further provides a storage medium containing computer-executable instructions, when the computer-executable instructions are executed by a computer processor, the Bluetooth data transmission method is executed.

Through the description of the preceding embodiments, the present application may be implemented by software plus a general-purpose hardware, or may be implemented by hardware. The technical solutions provided by the present application may be embodied in the form of a software product. The software product may be stored in a computer-readable storage medium, such as a floppy disk, a read-only memory (ROM), a random access memory (RAM), a flash, a hard disk or an optical disk, and includes several instructions for enabling a computer device (which may be a personal computer, a server or a network device) to execute the method provided by any one of the embodiments of the present application.

The above are only exemplary embodiments of the present application and are not intended to limit the scope of the present application.

A block diagram of any logic flow in drawings of the present application may represent program steps, or may represent interconnected logic circuits, modules, and functions, or may represent a combination of program steps, logic circuits, modules, and functions. The computer program may be stored in a memory. The memory may be in any type suitable for the local technical environment and may be implemented using any suitable data storage technology, for example, but not limited to, a read-only memory (ROM), a random access memory (RAM), and an optical memory apparatus and system (a digital video disc (DVD) or a compact disc (CD)). The computer-readable storage medium may include a non-transitory storage medium. The data processor may be of any type appropriate for the local technical environments such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A Bluetooth data transmission method, comprising:
    detecting a number of connected Bluetooth devices and types of the connected Bluetooth devices;

determining, according to the number of the connected Bluetooth devices and the types of the connected Bluetooth devices, whether to set an attribute state of the connected Bluetooth devices to an on-state; and transmitting, according to the attribute states, to-be-outputted Bluetooth data to one of the connected Bluetooth devices whose attribute state corresponding to the to-be-outputted Bluetooth data is the on-state;

wherein determining, according to the number of the connected Bluetooth devices and the types of the connected Bluetooth devices, whether to set the attribute state of the connected Bluetooth devices to the on-state comprises:

in a case where the number of the connected Bluetooth devices is greater than or equal to 2 and the types of the connected Bluetooth devices are all identical, setting an attribute state of a last-connected Bluetooth device among the connected Bluetooth devices to the on-state, and setting attribute states of non-last-connected Bluetooth devices among the connected Bluetooth devices to an off-state.

2. The method of claim 1, wherein determining, according to the number of the connected Bluetooth devices and the types of the connected Bluetooth devices, whether to set the attribute state of the connected Bluetooth devices to the on-state comprises:

in a case where the number of the connected Bluetooth devices is greater than or equal to 2 and not all of the types of the connected Bluetooth devices are identical, determining whether to set an attribute state of each of the connected Bluetooth devices to the on-state according to a first priority;

wherein the attribute state comprises a media audio attribute state, and the to-be-outputted Bluetooth data is media audio data generated according to a media audio playing instruction.

3. The method of claim 2, wherein determining whether to set the attribute state of each of the connected Bluetooth devices to the on-state according to the first priority comprises:

setting, according to the first priority, media audio attribute states of connected Bluetooth devices except a connected Bluetooth device with a highest priority among the connected Bluetooth devices to an off-state.

4. The method of claim 2, before determining, according to the number of the connected Bluetooth devices and the types of the connected Bluetooth devices, whether to set the attribute state of the connected Bluetooth devices to the on-state, further comprising:

sorting the connected Bluetooth devices from low to high according to privacies corresponding to the types of the connected Bluetooth devices to obtain the first priority of the connected Bluetooth devices.

5. The method of claim 1, wherein determining, according to the number of the connected Bluetooth devices and the types of the connected Bluetooth devices, whether to set the attribute state of the connected Bluetooth devices to the on-state comprises:

in a case where the number of the connected Bluetooth devices is greater than or equal to 2 and not all of the types of the connected Bluetooth devices are identical, determining whether to set an attribute state of each of the connected Bluetooth devices to the on-state according to a second priority;

wherein the attribute state comprises a phone call attribute state, and the to-be-outputted Bluetooth data is phone call data generated according to a phone call instruction.

6. The method of claim 5, wherein determining whether to set the attribute state of each of the connected Bluetooth devices to the on-state according to the second priority comprises:

setting, according to the second priority, phone call attribute states of connected Bluetooth devices except a connected Bluetooth device with a highest priority among the connected Bluetooth devices to an off-state.

7. The method of claim 5, before determining, according to the number of the connected Bluetooth devices and the types of the connected Bluetooth devices, whether to set the attribute state of the connected Bluetooth devices to the on-state, further comprising:

sorting the connected Bluetooth devices from high to low according to privacies corresponding to the types of the connected Bluetooth devices to obtain the second priority of the connected Bluetooth devices.

8. The method of claim 1, wherein the connected Bluetooth devices comprise a first device and a second device, and a privacy of the first device is lower than a privacy of the second device;

the attribute state comprises a media audio attribute state and a phone call attribute state; and wherein determining, according to the number of the connected Bluetooth devices and the types of the connected Bluetooth devices, whether to set the attribute state of the connected Bluetooth devices to the on-state comprises:

in a case of receiving a phone call instruction, setting the phone call attribute state of the second device to the on-state; and in a case of receiving a media audio playing instruction, setting the media audio attribute state of the first device to the on-state.

9. The method of claim 1, wherein the to-be-outputted Bluetooth data comprises at least one of media audio data or phone call data;

the attribute state comprises a media audio attribute state and a phone call attribute state; and wherein transmitting the to-be-outputted Bluetooth data to one of the connected Bluetooth devices whose attribute state corresponding to the to-be-outputted Bluetooth data is the on-state comprises at least one of:

transmitting the media audio data to a connected Bluetooth device whose media audio attribute state is the on-state; or transmitting the phone call data to a connected Bluetooth device whose phone call attribute state is the on-state.

10. The method of claim 1, further comprising:

detecting a to-be-paired Bluetooth devices;

in a case where the number of the connected Bluetooth devices is less than a maximum connection number, attempting to establish a connection with the detected to-be-paired Bluetooth device; and in a case where the number of the connected Bluetooth devices is greater than or equal to the maximum connection number, refusing to establish a connection with the detected to-be-paired Bluetooth device;

wherein the maximum connection number is determined according to information of candidate maximum connection numbers configured by a user.

11. The method of claim 10, further comprising:
after establishing the connection with the detected to-be-paired Bluetooth device, updating the number of the connected Bluetooth devices, and recording a type of the detected to-be-paired Bluetooth device.

12. A Bluetooth data transmission apparatus, comprising:
a detection module, which is configured to detect a number of connected Bluetooth devices and types of the connected Bluetooth devices;
an attribute determination module, which is configured to determine, according to the number of the connected Bluetooth devices and the types of the connected Bluetooth devices, whether to set an attribute state of the connected Bluetooth devices to an on-state; and
an outputting module, which is configured to transmit to-be-outputted Bluetooth data to one of the connected Bluetooth devices whose attribute state corresponding to the to-be-outputted Bluetooth data is the on-state;
wherein the attribute determination module is configured to, in a case where the number of the connected Bluetooth devices is greater than or equal to 2 and the types of the connected Bluetooth devices are all identical, set an attribute state of a last-connected Bluetooth device among the connected Bluetooth devices to the on-state and set attribute states of non-last-connected Bluetooth devices among the connected Bluetooth devices to an off-state.

13. A terminal, comprising:
at least one processor; and
a storage apparatus, which is configured to store at least one program;
wherein the at least one program, when executed by the at least one processor, causes the at least one processor to implement the following steps:
detecting a number of connected Bluetooth devices and types of the connected Bluetooth devices;
determining, according to the number of the connected Bluetooth devices and the types of the connected Bluetooth devices, whether to set an attribute state of the connected Bluetooth devices to an on-state; and
transmitting to-be-outputted Bluetooth data to one of the connected Bluetooth devices whose attribute state corresponding to the to-be-outputted Bluetooth data is the on-state;
wherein the at least one processor is caused to implement determining, according to the number of the connected Bluetooth devices and the types of the connected Bluetooth devices, whether to set the attribute state of the connected Bluetooth devices to the on-state by:
in a case where the number of the connected Bluetooth devices is greater than or equal to 2 and the types of the connected Bluetooth devices are all identical, setting an attribute state of a last-connected Bluetooth device among the connected Bluetooth devices to the on-state, and setting attribute states of non-last-connected Bluetooth devices among the connected Bluetooth devices to an off-state.

14. A non-transitory computer-readable storage medium storing a computer program, wherein the computer program, when executed by a processor, implements the Bluetooth data transmission method of claim 1.

15. The terminal of claim 13, wherein the at least one processor implements determining, according to the number of the connected Bluetooth devices and the types of the connected Bluetooth devices, whether to set the attribute state of the connected Bluetooth devices to the on-state by:
in a case where the number of the connected Bluetooth devices is greater than or equal to 2 and not all of the types of the connected Bluetooth devices are identical, determining whether to set an attribute state of each of the connected Bluetooth devices to the on-state according to a first priority;
wherein the attribute state comprises a media audio attribute state, and the to-be-outputted Bluetooth data is media audio data generated according to a media audio playing instruction.

16. The terminal of claim 15, wherein the at least one processor implements determining whether to set the attribute state of each of the connected Bluetooth devices to the on-state according to the first priority by:
setting, according to the first priority, media audio attribute states of connected Bluetooth devices except a connected Bluetooth device with a highest priority among the connected Bluetooth devices to an off-state.

17. The terminal of claim 15, wherein before determining, according to the number of the connected Bluetooth devices and the types of the connected Bluetooth devices, whether to set the attribute state of the connected Bluetooth devices to the on-state, the at least one processor further implements:
sorting the connected Bluetooth devices from low to high according to privacies corresponding to the types of the connected Bluetooth devices to obtain the first priority of the connected Bluetooth devices.

18. The terminal of claim 13, wherein the at least one processor implements determining, according to the number of the connected Bluetooth devices and the types of the connected Bluetooth devices, whether to set the attribute state of the connected Bluetooth devices to the on-state by:
in a case where the number of the connected Bluetooth devices is greater than or equal to 2 and not all of the types of the connected Bluetooth devices are identical, determining whether to set an attribute state of each of the connected Bluetooth devices to the on-state according to a second priority;
wherein the attribute state comprises a phone call attribute state, and the to-be-outputted Bluetooth data is phone call data generated according to a phone call instruction.

19. The terminal of claim 18, wherein the at least one processor implements determining whether to set the attribute state of each of the connected Bluetooth devices to the on-state according to the second priority by:
setting, according to the second priority, phone call attribute states of connected Bluetooth devices except a connected Bluetooth device with a highest priority among the connected Bluetooth devices to an off-state.

20. The terminal of claim 18, wherein before determining, according to the number of the connected Bluetooth devices and the types of the connected Bluetooth devices, whether to set the attribute state of the connected Bluetooth devices to the on-state, the at least one processor is caused to further implement:
sorting the connected Bluetooth devices from high to low according to privacies corresponding to the types of the connected Bluetooth devices to obtain the second priority of the connected Bluetooth devices.

* * * * *